United States Patent
Stevens, Jr. et al.

(10) Patent No.: US 6,986,035 B2
(45) Date of Patent: Jan. 10, 2006

(54) MODULAR BIOS FOR DETECTING RESOURCES OF A SYSTEM AND REPORTING INFORMATION ABOUT THE RESOURCES DURING TWO SEPARATE PHASES

(75) Inventors: Williams A. Stevens, Jr., Folsom, CA (US); Robert P. Hale, Portland, OR (US); Emmett R. Uber, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 10/210,197

(22) Filed: Jul. 31, 2002

(65) Prior Publication Data

US 2004/0025001 A1 Feb. 5, 2004

(51) Int. Cl.
*G06F 9/44* (2006.01)
(52) U.S. Cl. .......................................... 713/2
(58) Field of Classification Search ..................... 713/2
See application file for complete search history.

(56) References Cited

U.S. PATENT DOCUMENTS

| | | | | |
|---|---|---|---|---|
| 5,109,484 A | * | 4/1992 | Hughes et al. ............... | 709/222 |
| 5,854,905 A | * | 12/1998 | Garney ........................ | 710/104 |
| 6,336,152 B1 | * | 1/2002 | Richman et al. ................ | 710/8 |
| 6,633,976 B1 | * | 10/2003 | Stevens ......................... | 713/2 |
| 6,763,454 B2 | * | 7/2004 | Wilson et al. .................. | 713/1 |
| 2003/0154368 A1 | * | 8/2003 | Stevens, Jr. et al. | |
| 2003/0188146 A1 | * | 10/2003 | Hale et al. | |

* cited by examiner

*Primary Examiner*—Lynne H. Browne
*Assistant Examiner*—Anand B. Patel
(74) *Attorney, Agent, or Firm*—Trop, Pruner & Hu, P.C.

(57) ABSTRACT

A technique that is usable with a computer system includes, in response to a startup phase of the computer system in which a system memory of the computer system is not initialized for data storage, detecting a resource of the computer system. Information about the resource reported in response to a second phase of the computer system in which the system memory is initialized.

29 Claims, 6 Drawing Sheets

MODULAR BIOS FOR DETECTING RESOURCES OF A SYSTEM AND REPORTING INFORMATION ABOUT THE RESOURCES DURING TWO SEPARATE PHASES

BACKGROUND

The invention generally relates to a modular BIOS and reporting information among various modules of the BIOS.

Operating systems have continually evolved. For example, older computer systems (8086, 8088 or 80286 processor-based computer systems, as examples) use sixteen bit real mode operating systems, such as MS-DOS operating systems. However, these operating systems lack multi-tasking and memory management features provided by more recent operating systems, such as thirty-two bit and sixty-four bit virtual mode operating systems.

A typical computer system includes a basic input/output system (BIOS), a term that refers to firmware that, when executed, controls various functions (keyboard, disk drives and display screen functions, for example) of the computer system at a basic level. In response to the computer booting up, a microprocessor of the computer system executes the BIOS to perform a power on self-test (POST) to locate, initialize and test devices of the computer system. Due to its ability to control the disk drives when the computer system "boots up," the BIOS is also responsible for loading the operating system. In this manner, the typical computer system boots up by executing BIOS instructions that cause a operating system loader program to be loaded from a disk drive into system memory. The BIOS may then cause the computer system to execute the loader program that, in turn, causes the computer system to load portions of the operating system into the system memory. Subsequently, the operating system may execute one or more program(s) to initialize and start execution of the operating system. Afterwards, certain BIOS functions are used during the operation of the computer system.

The BIOS image (i.e., the program code and parameter space that define the BIOS) is stored in a memory that does not lose its stored contents when power to the computer system is removed. For example, the BIOS image may be stored in a FLASH memory, an erasable electrically programmable read only memory (EEPROM) that may be rapidly updated.

For purposes maximizing the flexibility of the BIOS, it may be desirable to form the BIOS from a group of modules to form a modular BIOS. In this manner, these modules may be plug-in modules that are each associated with one or more BIOS functions. However, a potential challenge of this arrangement is ensuring that the modules communicate with each other. To facilitate this communication, the modules may be designed with knowledge of the program code and functions that are performed by the other modules. However, such a design decreases the degree of flexibility that may otherwise be present with a pure modular approach.

Thus, there is a continuing need for an arrangement and/or technique to address one or more of the problems that are stated above.

DETAILED DESCRIPTION

Figure 1:
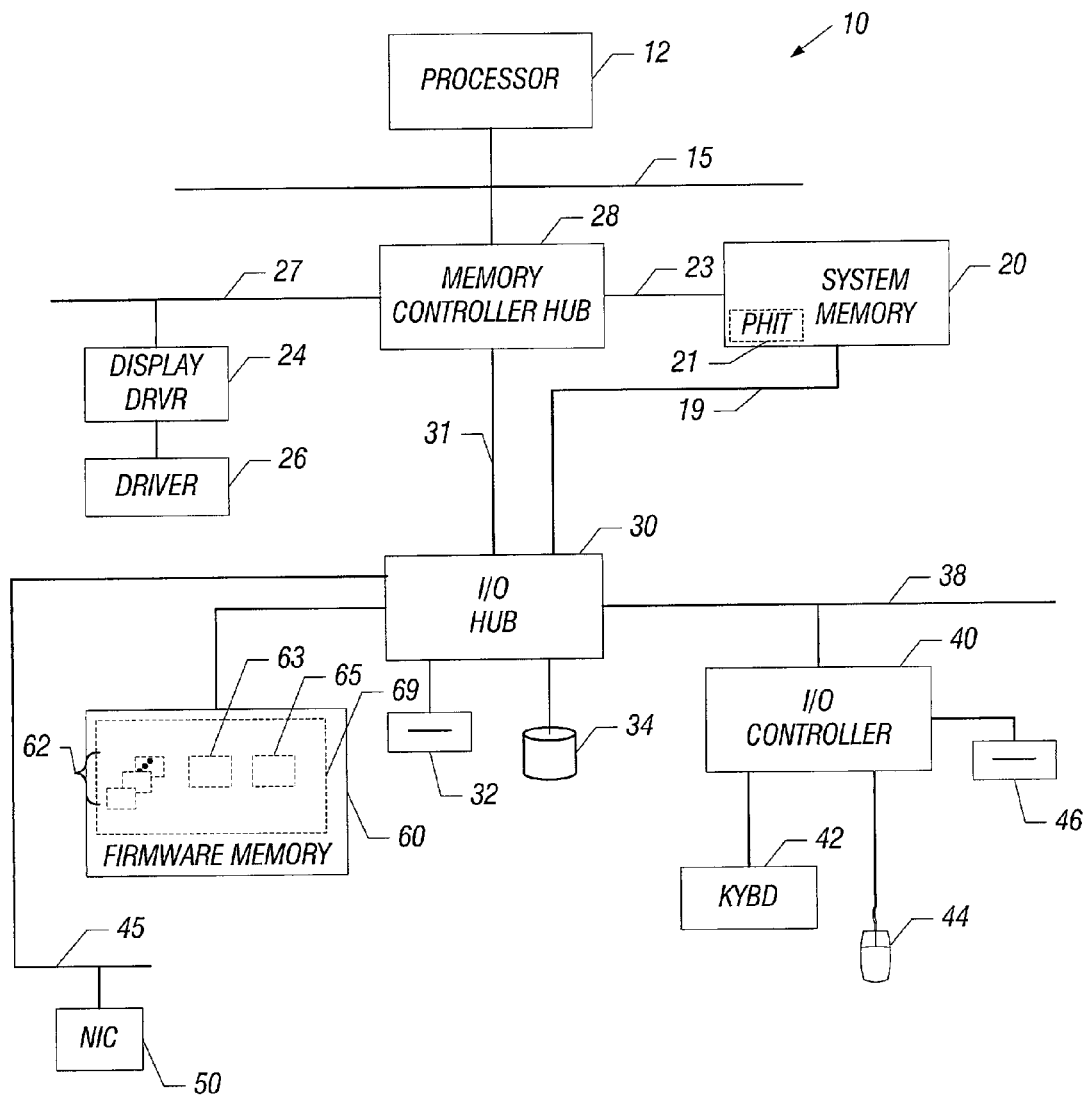
FIG. 1 is a schematic diagram of a computer system according to an embodiment of the invention.

Referring to FIG. 1, an embodiment 10 of a computer system in accordance with the invention includes a firmware memory 60 that stores a basic input/output system (BIOS) image 69, an image that stores program code, parameters and other resources that are used for purposes of establishing a BIOS for the computer system 10. For purposes of permitting flexibility in configuring the BIOS, as well as flexibility in upgrading the BIOS, the BIOS image 69 includes various BIOS modules. Each BIOS module, in turn, contains program instructions, or "code," and a structure that may be developed independently from the other BIOS modules. Thus, a processor (one or more microprocessors, for example) 12 of the computer system 10 may selectively execute these BIOS modules to establish the system's BIOS. For example, during bootup of the computer system 10, the processor 12 may execute the BIOS modules to establish a power on self test (POST) as well selectively execute these BIOS modules to perform various BIOS functions after POST.

Turning to a more specific implementation, in some embodiments of the invention, the processor 12 schedules the BIOS modules for execution by executing a core dispatcher 63, another component of the BIOS image 69. As examples, the BIOS modules that are scheduled for execution by the core dispatcher 63 may include plug-in environment initialization (PEI) modules 62, modules that executed to detect and initialize various resources of the computer system 10 during initial bootup of the system 10, i.e., during a phase (called "phase one" herein) of POST in which system memory 20 has not been initialized for purposes of general data storage and retrieval to and from the memory arrays of its memory devices.

In the context of this application, the language "system memory" refers to the main general purpose memory (of the system 10) that forms most of the random access memory capacity of the system 10. In this manner, the system memory 20 may be formed from single inline memory modules (SIMMs) or dual in-line memory modules (DIMMs), as examples. Each SIMM or DIMM (if SIMMs or DIMMs are used) may include, as examples, synchronous dynamic random access memory (SDRAM) devices and/or double data rate SDRAM (DDR SDRAM) devices. Various data and instructions may be stored in the system memory 20, such as operating system instructions, image data, application program instructions, etc.

During phase one of POST, the execution of one or more PEI BIOS modules 62 causes the processor 12 to detect and initialize the various devices (SDRAM devices, for example) of the system memory 20. After completion of this phase of POST, the processor 12 executes the core dispatcher 63 that causes the transition into another phase (called "phase two" herein) of POST in which system memory 20 is initialized and available for general data storage and retrieval. As described below, it is in phase two that the processor 12 may re-execute the PEI modules 62 for purposes of posting information to the system memory 20 regarding resources discovered during phase one. This information may be used by other BIOS modules that are executed to perform various POST and other BIOS functions. One such module, called a plug-in execution (PIX) module 65, is depicted in FIG. 1. It is possible that the execution of the PIX module 65 may cause the processor 12 to detect and initialize resources (of the computer system 10) that were not detected or set up in phase one of POST. As an example, a particular PIX module 65 may be executed to detect and set up resources associated with a display driver of the computer system 10.

As a more specific example of the functions performed due to execution of the PEI modules 62 during phase one, the processor 12 may execute a particular PEI module 62 to detect and query various semiconductor memory devices of the system memory 20. In this query, the execution of the particular PEI module 62 retrieves various information about the detected memory devices, such as information regarding the memory device configurations, memory device sizes and the manufacturers of the memory devices. The execution of the PEI module 62 may also initialize the SDRAMs for access by components of the computer system 10 for purposes of general data storage and retrieval subsequent to phase one.

As another example, a particular PEI module 62 may be associated with discovering and initializing a non-memory resource of the computer system 10, such as a system management bus 19 of the computer system 10. Various other functions may be performed by the execution of the various PEI modules 62 in phase one of POST.

As mentioned above, in phase two of POST the system memory 20 (through the execution of one or more PEI modules 62 during phase one) is available for general data storage and retrieval. The execution of the PEI modules 62 takes advantage of this memory access during phase two of POST to post information about resources that were discovered during phase one. As described below, this information is written to the system memory 20 in the form of a table, a format that permits various independently designed BIOS modules (such as the PEI modules 62 and the PIX module 65, described below) to contribute to entries of the table and/or read entries from the table.

Figure 2:
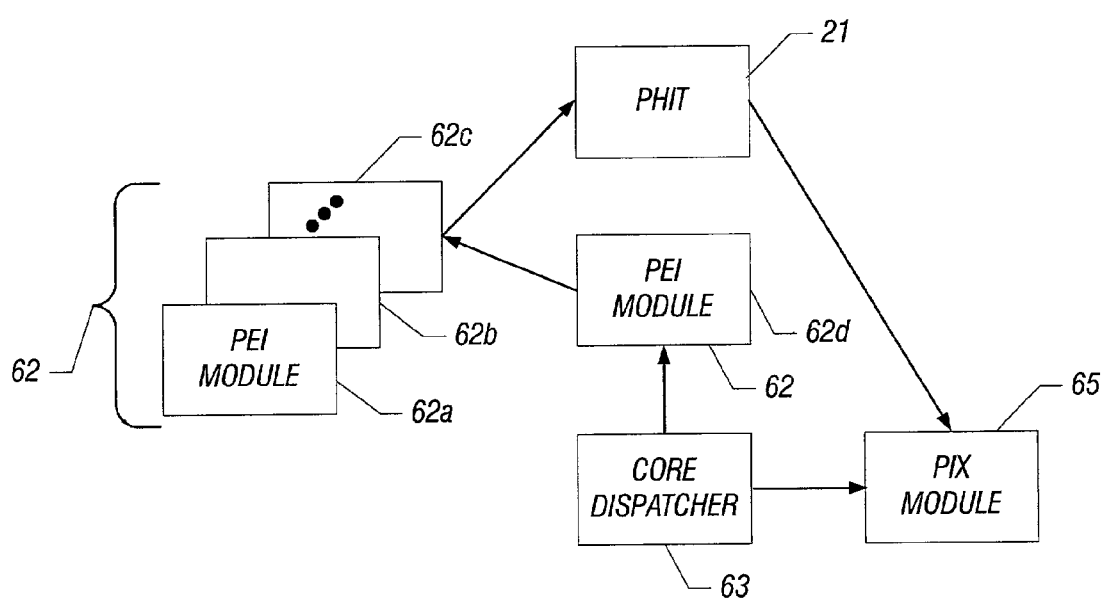
FIG. 2 is an illustration of a software architecture of a BIOS of FIG. 1 according to an embodiment of the invention.

More specifically, referring to FIG. 2, in some embodiments of the invention, the BIOS may have an architecture that includes various PEI modules (modules 62a, 62b, 62c and 62d, depicted as examples), each of which is executed to perform a different BIOS function. The modularity of the BIOS leaves open the number of PEI modules 62, as well as the specific functions that are associated with their execution. In some embodiments of the invention, a specific 62d PEI module may be scheduled by execution by the core dispatcher 63 for purposes of loading information into one of the PIX modules 65.

Figure 3:
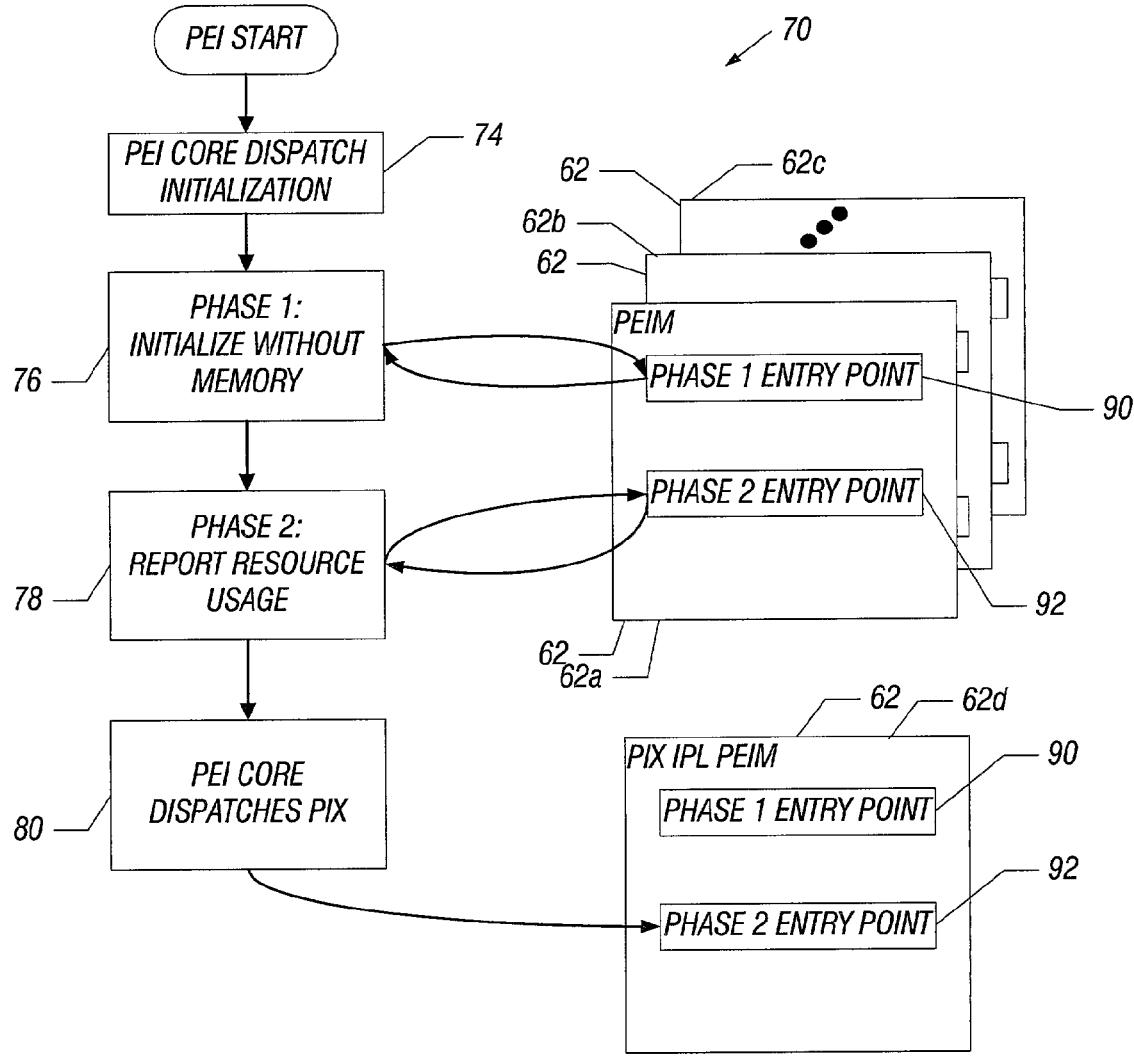
FIG. 3 is a flow diagram depicting a technique using BIOS modules according to an embodiment of the invention.

To implement the discovery and reporting features of the PEI modules 62, in some embodiments of the invention, the BIOS (when executed by the processor 12) may cause the processor 12 to perform a technique 70 that is depicted in FIG. 3. In this manner, in this technique 70, the processor 12 initializes (block 74) the PEI core dispatcher 63. Next, the core dispatcher 63 (via its execution by the processor 12) schedules (block 76) the PEI modules 62 for execution to initialize various resources of the computer system 10 during phase one of POST. As described above, during phase one, access to the system memory 20 is not initialized and is not available for the general storage and retrieval of data from memory arrays of its memory devices.

The information gained by the PEI modules 62 during phase one is reported (via the PHIT 21) by the PEI modules 62 during phase two. In some embodiments of the invention, to implement the dual functions of the PEI modules 62, each PEI module 62 may include two execution entry points: a first entry point 90 at which execution of the software instructions, or code, of the PEI module 62 begins in phase one of POST and a second entry point 92 at which execution of the software instructions, or code, of the PEI module 62 begins in phase two of POST. In this manner, the phase one entry point 90 of each PEI module 62 is the beginning point of program code that, when executed by the processor 12, causes the processor 12 to discover the various resources of the computer system and retrieve various information about these resources. However, during phase one, the system memory 20 is not available to store data related to the discovered information. This reporting (via the creation of the PHIT 21) occurs in phase two, a phase in which the processor 12 re-executes the same PEI modules 12 to report (block 78) the resources discovered during phase one. In this manner, in the subsequent execution, each PEI module 62 builds part of the PHIT 21 to report the discovered resources. As previously noted, the PHIT 21 may be stored in the system memory 20, a memory that is initialized and available during phase two.

After reporting the resource usage in block 78, the technique 70 includes transferring certain information to a PIX module 65 to be executed, as depicted in block 80. To accomplish this, the PEI module 62d has a phase two entry point 92 for purposes of executing instructions to load information for use by the PIX module 65. Among the information passed between the PEI module 62d and the PIX module 65 is a linear address of the PHIT 21.

Figure 4:
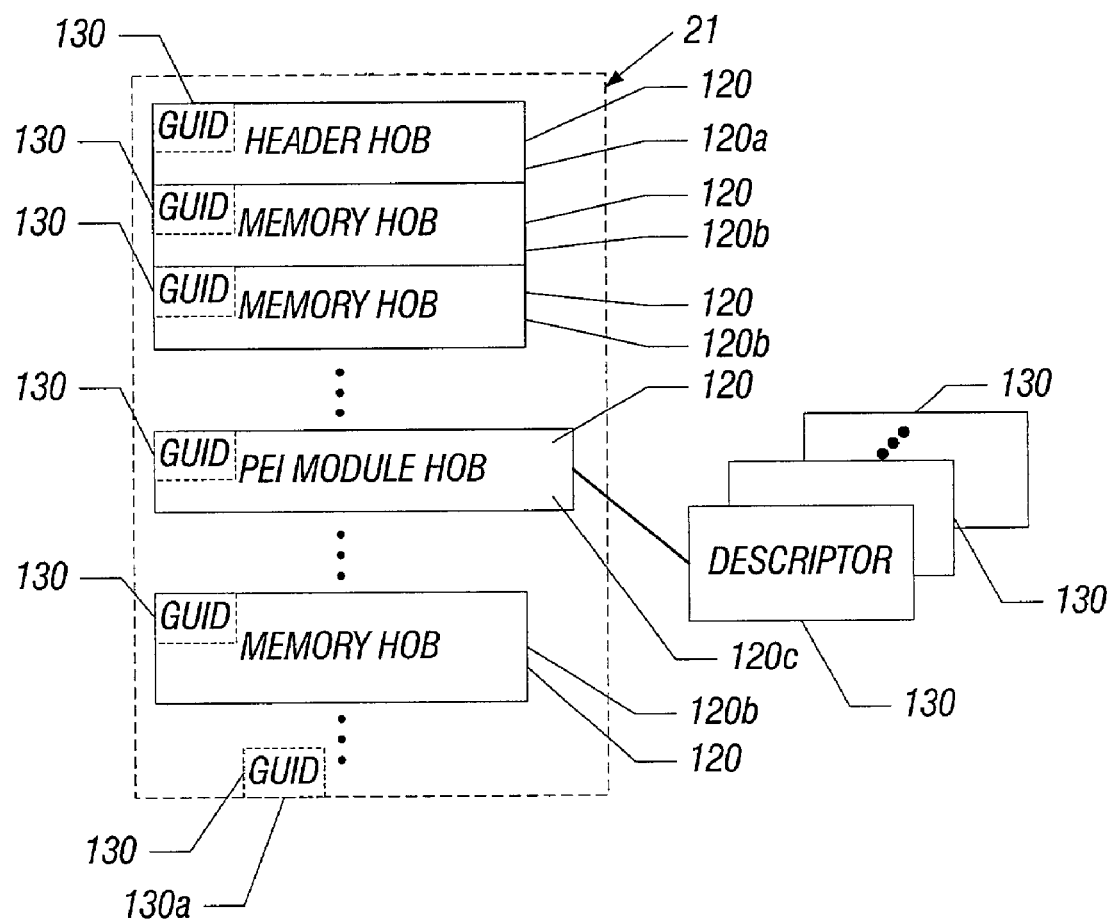
FIG. 4 is an illustration of a table according to an embodiment of the invention.

Referring to FIG. 4, in some embodiments of the invention, the PEIs 62 (through their execution) form the PHIT 21 from hand off blocks (HOBs) 120, blocks may form a contiguous block in the system memory 20, and each HOB is associated with a particular memory region, PEI module 62 or the structure of the PHIT 21 itself. Regardless of the type of HOB 120, each HOB 120 begins with a GUID field 130, a field that uniquely identifies the particular HOB 120. Following the GUID field 130 in the HOB 120 is a field specifying the length of the HOB. This field is followed in the HOB 120 by data specific to the structure that is associated with the particular HOB 120.

The first HOB 120 in the PHIT 21, in some embodiments of the invention, is a header, further described below. Subsequent HOBs 21 of the PHIT 21 appear in no defined order. The end of the PHIT 21 is terminated by a predefined GUID field 130a, such as a GUID field 130 of all "0s," for example.

As examples of specific HOBs 121, in some embodiments of the invention, the HOBs 120 may include the header hob 120a, and memory HOBs 120b. Each memory HOB 120b describes a particular physical memory, or range, available in the computer system 10 and may indicate whether the particular memory range has been tested. Besides the memory HOBs 120b, the HOBs 120 may also include a PEI module HOB 120*c* whose structure is specific to a particular PEI module 62, as described below.

Figure 5:
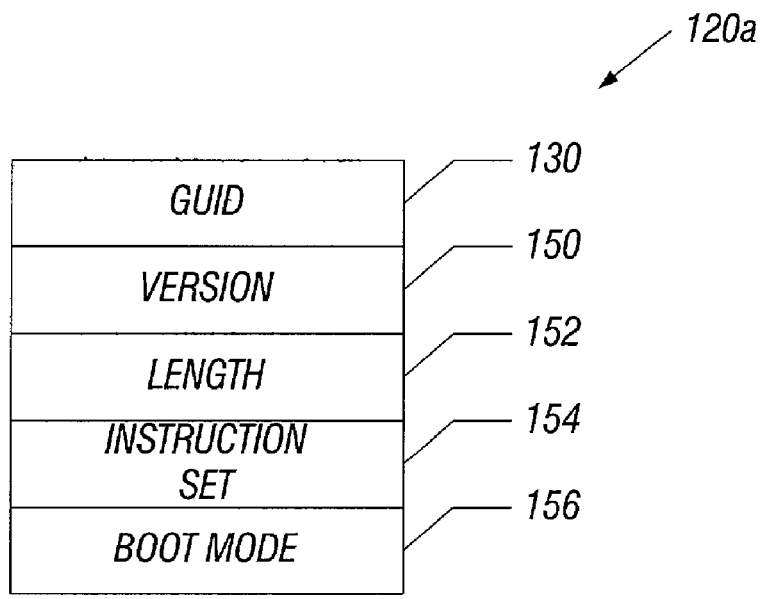
FIG. 5 is an illustration depicting the organization of a header hand off block according to an embodiment of the invention.

Referring to FIG. 5, in some embodiments of the invention, the header HOB 120*a* has the following structure. This structure includes the GUID field 130 that identifies, or names, the PHIT 21. The HOB 120*a* may also include a version field 150 that indicates the current version of the PHIT 21, for purposes of determining compatibility. Next, the header HOB 120*a* may include a length field 152 that indicates the length (in bytes, for example) of the PHIT 21. The header HOB 120*a* may also include an instruction set field 154 that identifies processor instruction compatibility, and lastly, the header HOB 120*a* may include a boot mode field 156 that indicates a boot mode for the computer system 10. Other and different fields may be used.

Figure 6:
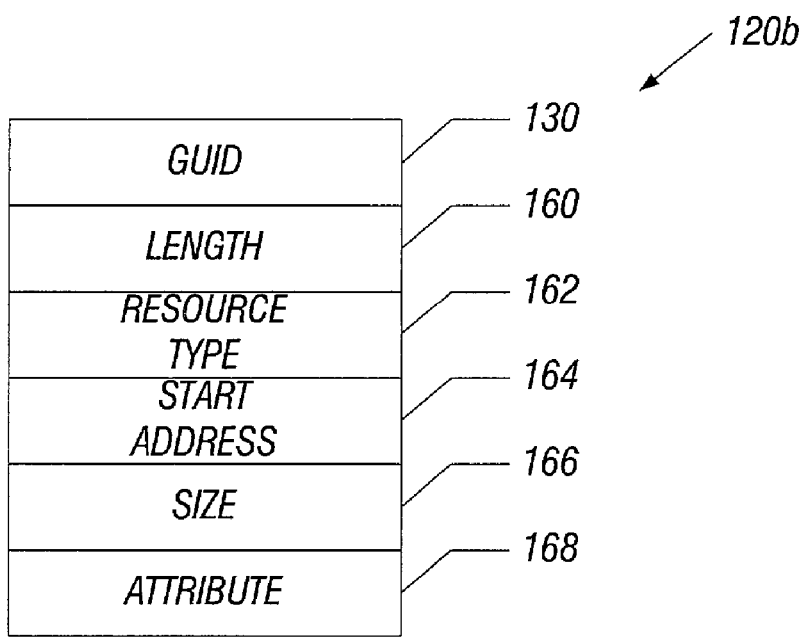
FIG. 6 is an illustration depicting the organization of a memory hand off block according to an embodiment of the invention.

Referring to FIG. 6, in some embodiments of the invention, a particular memory HOB 120*b* may include the following structure. This structure may include the GUID field 130 that uniquely identifies the HOB 120*b* as a HOB memory block. The memory HOB 120*b* may also include a length field 160 that indicates a length of the memory HOB 120*b* (in bytes, for example).

Next, the memory HOB 120*b* may include a resource type enumeration field 162. For example, the resource that is described by the particular memory HOB 120*b* may be a system memory, a memory mapped input/output (I/O) memory space, or a firmware memory, as just a few examples. The memory HOB 120*b* may also include a field 164 that indicates a start address, which is the beginning address of the memory region that is described by the memory HOB 120*b*. The memory HOB 120*b* may also include a size field 166 that indicates the number of bytes of the particular memory region that is described by the particular memory HOB 120*b*.

The memory HOB 120*b* may also include an attribute field 168 that indicates the attributes of the described memory region. For example, data stored in the attribute field 168 may indicate whether the memory is present; whether memory is initialized; whether the memory has been tested; the correction codes used in association with the memory; whether the memory is read protected or write protected; whether the memory is execution protected; whether the memory is cached; and various other cached and I/O features associated with the system memory 20.

Figure 7:
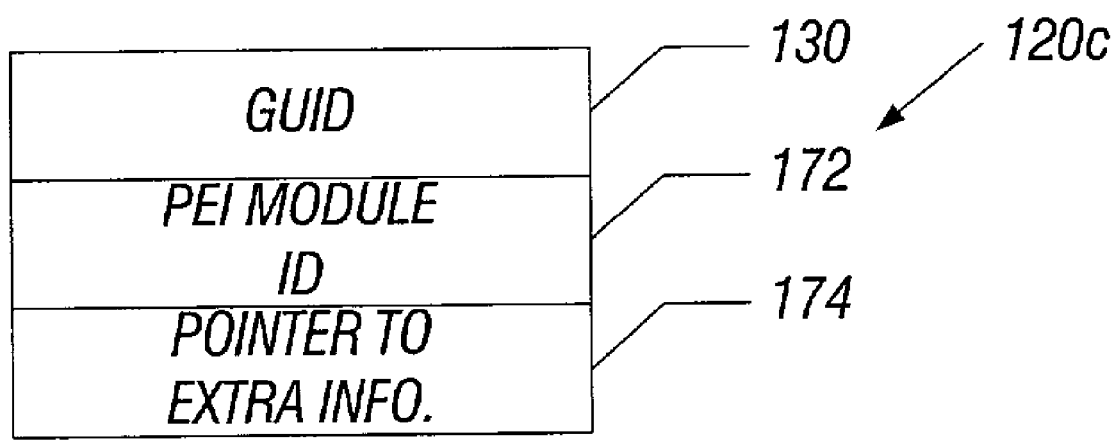
FIG. 7 is an illustration depicting the organization of a BIOS module-specific hand off block according to an embodiment of the invention.

Referring to FIG. 7, in some embodiments of the invention the PEI module-specific HOB 120*c* may have the following structure. The structure includes the GUID field 130 that indicates that this is a PEI module-specific HOB. Furthermore, the PEI HOB 120*c* may include a PEI module identification field 172 that indicates the identification of the PEI module 62 creating the information in the HOB 120*c*. For the information related to this PEI module, the HOB 120*c* may include a pointer to the start of a linked list of PEI module information descriptors 30. This linked list of descriptors 30 may reside outside of the PHIT 21.

Referring back to FIG. 1, among the other features of the computer system 10, the system 10 may include a north bridge, or memory controller hub 28, that communicates with the system memory 20 over a memory bus 23. The memory controller hub 28 serves as an interface between a system bus 15 (that is coupled to the processor 12), an Accelerated Graphics Port (AGP) bus 27, the memory bus 23 and a hub interface 31. The AGP is described in detail in the Accelerated Graphics Port Interface Specification, Revision 1.0, published on Jul. 31, 1996, by Intel Corporation of Santa Clara, Calif. The computer system 10 may also include a display driver 24 that is coupled to the AGP bus 27 and generates signals to drive a display 26.

The memory controller hub 28 is coupled (via the hub interface 31) to an input/output (I/O) hub 30. The I/O hub 30 may provide interfaces to, for example, a Peripheral Component Interconnect (PCI) bus 45 and an I/O expansion bus 38. The PCI Specification is available from The PCI Special Interest Group, Portland, Oreg. 97214.

The PCI bus 45 may be coupled to a network interface card (NIC) 50, and an I/O controller 40 may be coupled to the I/O expansion bus 38. The I/O controller 40 receives input from a mouse 44 and a keyboard 42, as well as control operation of a floppy disk drive 46. The I/O hub 52 may control operation of a CD-ROM drive 32 and control operation of a hard disk drive 34.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method usable with a computer system, comprising:
   in response to a startup phase of the computer system in which a system memory of the computer system is not initialized, detecting a resource of the computer system; and
   reporting information about the resource in response to a second phase of the computer system in which the system memory is initialized.

2. The method of claim 1, wherein the reporting comprises:
   storing an indication of the information in the memory in response to the second phase.

3. The method of claim 1, wherein the detecting comprises executing a basic input/output system module.

4. The method of claim 1, wherein the reporting comprises creating information in a table accessible by basic input/output system modules.

5. The method of claim 4, further comprising:
   storing the table in the memory.

6. The method of claim 1, wherein a power on self-test of the computer system transitions through the startup and second phases.

7. A method usable with a computer system, comprising:
   in response to a startup phase of the computer system in which a system memory is not initialized, executing a basic input/output system module in a first pass to detect a resource of the computer system;
   completing the execution of the module in response to the startup phase; and
   in response to a second phase of the computer system in which the memory is initialized, executing the module in a subsequent second pass to report information about the resource.

8. The method of claim 7, wherein executing the module to detect the resource comprises:
   executing the module beginning at a first entry point; and
   executing the module beginning at a second entry point.

9. The method of claim 7, further comprising executing additional basic input/output system modules to detect additional resources of the computer system.

10. The method of claim 9, further comprising:
    executing the additional modules in response to the second phase.

11. A computer system comprising:
  a system memory subject to a first phase in which memory is initialized and a second phase in which the memory is initialized; and
  a processor to, in response to the first phase, detect a resource of the computer system, and
  report information about the resource in response to the second phase.

12. The computer system of claim 11, wherein the processor executes a basic input/output system module to detect the resource.

13. The computer system of claim 11, wherein the processor creates information in a table accessible by basic input/output system modules.

14. The computer system of claim 11, wherein a power on self-test of the computer system transitions through the startup and second phases.

15. A computer system comprising:
  a system memory subject to a startup phase in which the memory is not initialized and a second phase in which the memory is initialized; and
  a processor to, in response to the startup phase, execute a basic input/output system module to detect a resource of the computer system,
  complete the execution of the module in response to the startup phase, and
  in response to the second phase, execute the module again to report information about the resource.

16. The computer system of claim 15, wherein the processor executes the basic input/output system module to detect the resource by executing the module beginning at a first entry point and executing the module beginning at a second entry point.

17. The computer system of claim 15, wherein the processor executes additional basic input/output system modules to detect additional resources of the computer system.

18. The computer system of claim 17, wherein the processor executes the additional modules during the second phase.

19. A method usable with a computer system comprising:
  executing each of a set of basic input/output system modules in a first pass to detect resources of the computer system;
  creating a table; and
  executing each of the modules in a second pass to store an indication of information about at least one of the resources in the table.

20. The method of claim 19, wherein the storing comprises:
  creating a hand off block describing a region of memory in the computer system.

21. The method of claim 20, wherein the hand off block comprises:
  at least one of a memory hand off block, a header hand off block and a hand off block specific to one of the system modules.

22. The method of claim 19, wherein the execution of the basic input/output system modules in the first pass occurs during a phase of the computer system in which system memory is not initialized.

23. An article comprising a computer readable storage medium storing instructions to when executed by a computer cause the computer to:
  in response to a startup phase of a computer system in which a system memory of the computer system is not initialized, detect a resource of the computer system; and
  report information about the resource in response to a second phase of the computer system in which the memory is initialized.

24. The article of claim 23, wherein a power on self-test of the computer system transitions through the startup and second phases.

25. An article comprising a computer readable storage medium storing instructions to when executed by a computer cause the computer to:
  in response to a startup phase of a computer system in which a system memory of the computer system is not initialized, execute a basic input/output system module to detect a resource of the computer system;
  complete the execution of the module in response to the startup phase; and
  in response to a second phase of the computer system in which the memory is initialized, execute the module again to report information about the resource.

26. The article of claim 25, further comprising instructions to cause the processor to execute the module beginning at a first entry point, and execute the module beginning at a second entry point.

27. An article comprising a computer readable storage medium storing instructions to when executed by a computer cause the computer to:
  execute each of a set of basic input/output system modules in a first pass to detect resources of a computer system;
  create a table; and
  execute each of the modules in a second pass to store an indication of information about at least one of the resources in the table.

28. The article of claim 27, the storage medium storing instructions to when executed by the computer cause the computer to:
  create a hand off block indicative of a region of memory in the computer system.

29. The article of claim 28, wherein the hand off block comprises:
  at least one of a memory hand off block, a header and a hand off block specific to one of the system modules.

* * * * *